(12) United States Patent
Garland et al.

(10) Patent No.: US 7,840,844 B2
(45) Date of Patent: Nov. 23, 2010

(54) TECHNIQUES FOR PRIORITIZING TEST DEPENDENCIES

(75) Inventors: Adam Garland, Worcester, MA (US); Ricardo Lopez Barquilla, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 735 days.

(21) Appl. No.: 11/787,319

(22) Filed: Apr. 16, 2007

(65) Prior Publication Data

US 2008/0256392 A1  Oct. 16, 2008

(51) Int. Cl.
*G06F 11/00* (2006.01)

(52) U.S. Cl. .......................................... 714/33; 717/124

(58) Field of Classification Search .................... None
See application file for complete search history.

(56) References Cited

U.S. PATENT DOCUMENTS

| | | | |
|---|---|---|---|
| 5,164,912 A | 11/1992 | Osborne et al. | |
| 5,754,760 A * | 5/1998 | Warfield | 714/38 |
| 5,805,795 A * | 9/1998 | Whitten | 714/38 |
| 5,922,079 A | 7/1999 | Booth et al. | |
| 6,282,527 B1 * | 8/2001 | Gounares et al. | 706/13 |
| 6,438,712 B1 * | 8/2002 | Abi-Saleh | 714/38 |
| 6,546,506 B1 | 4/2003 | Lewis | |
| 6,557,115 B2 | 4/2003 | Gillenwater et al. | |
| 6,625,760 B1 * | 9/2003 | Man et al. | 714/33 |
| 6,694,288 B2 | 2/2004 | Smocha et al. | |
| 7,028,290 B2 | 4/2006 | Srivastava et al. | |
| 7,139,676 B2 * | 11/2006 | Barford | 702/183 |
| 7,178,063 B1 * | 2/2007 | Smith | 714/38 |
| 7,536,600 B2 * | 5/2009 | Fay et al. | 714/37 |
| 2004/0268308 A1 | 12/2004 | Srivastava et al. | |
| 2005/0091003 A1 * | 4/2005 | Wu | 702/183 |
| 2005/0257086 A1 | 11/2005 | Triou, Jr. et al. | |
| 2006/0184918 A1 | 8/2006 | Rosaria et al. | |
| 2007/0006037 A1 | 1/2007 | Sargusingh et al. | |
| 2007/0094542 A1 * | 4/2007 | Bartucca et al. | 714/38 |

OTHER PUBLICATIONS

Elbaum, et al., "Prioritizing Test Cases for Regression Testing", http://delivery.acm.org/10.1145/350000/348910/p102-elbaum.pdf?key1=348910&key2=4271560711&coll=GUIDE&dl=GUIDE&CFID=10640851&CFTOKEN=66002764, Sep. 2000.

Elbaum, et al., "Incorporating Varying Test Costs and Fault Severities into Test Case Prioritization", http://delivery.acm.org/10.1145/390000/381508/p329-elbaum.pdf?key1=381508&key2=1192560711001&coll=GUIDE&dl=GUIDE&CFID=10641564&CFTOKEN=42126440, 2001.

Kim, et al., "A History-Based Test Prioritization Technique for Regression Testing in Resource Constrained Environments", Date: May 19-25, 2002, http://delivery.acm.org/10.1145/590000/581357/p119-kim.pdf?key1=581357&key2=8312560711&coll=GUIDE&dl=GUIDE&CFID=10641085&CFTOKEN=98781907.

* cited by examiner

*Primary Examiner*—Gabriel L Chu

(57) ABSTRACT

Techniques for prioritizing test dependencies are described. A computer system employing such techniques may present a test structure for a set of test cases. The test structure may comprise prioritized test cases and dependencies between test cases. The dependencies may be based on predicted test case failure given failure of another test case. Other embodiments are described and claimed.

17 Claims, 5 Drawing Sheets

200

```
┌─────────────────────────────────────────┐
│  PREDICT TEST CASE FAILURE GIVEN        │
│  FAILURE OF ANOTHER TEST CASE           │
│                 202                     │
└─────────────────────────────────────────┘
                    │
┌─────────────────────────────────────────┐
│ DETERMINE DEPENDENCIES BETWEEN TEST     │
│ CASES BASED ON PREDICTED TEST CASE      │
│ FAILURE                                 │
│                 204                     │
└─────────────────────────────────────────┘
                    │
┌─────────────────────────────────────────┐
│   PRIORITIZE TEST CASES AND             │
│   DEPENDENCIES                          │
│                 206                     │
└─────────────────────────────────────────┘
                    │
┌─────────────────────────────────────────┐
│ CREATE TEST STRUCTURE ACCORDING TO      │
│ PRIORITIZED TEST CASES AND DEPENDENCIES │
│                 208                     │
└─────────────────────────────────────────┘
```

137872: BVT Outline
   138767 BVT Keyboard navigation
      141333 Insert Document
      141917 Find with AND
   150332 Move Outline Down
      150335 Move Outline Up
      153702 Promote and demote
          Outline

TECHNIQUES FOR PRIORITIZING TEST DEPENDENCIES

BACKGROUND

Development of a new product may involve extensive automated testing. In some cases, automated test cases may generate a relatively large number of failures which must be investigated and corrected. When automated test cases fail, the consumption of computer run time and investigation time can be substantial. In terms of run time, if any of the automated test cases start to fail, the amount of time required to complete a run can increase significantly since failures tend to take more time. In terms of failure investigation, a single code defect may produce failures in multiple test cases. The investigation of each failure individually consumes valuable time.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments are directed to techniques for prioritizing test dependencies. A computer system employing such techniques may display a test structure for a set of test cases. The test structure may comprise prioritized test cases and dependencies between test cases. The dependencies may be based on predicted test case failure given failure of another test case. Other embodiments are described and claimed.

BRIEF DESCRIPTION OF THE DRAWINGS

FIG. 2 illustrates an exemplary embodiment of a logic flow.

DETAILED DESCRIPTION

Various embodiments are directed to techniques for prioritizing test dependencies. Numerous specific details are set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

It is worthy to note that any reference to "one embodiment" or "an embodiment" means that a particular feature, structure, or characteristic described in connection with the embodiment is included in at least one embodiment. The appearances of the phrase "in one embodiment" are not necessarily all referring to the same embodiment.

Figure 1:
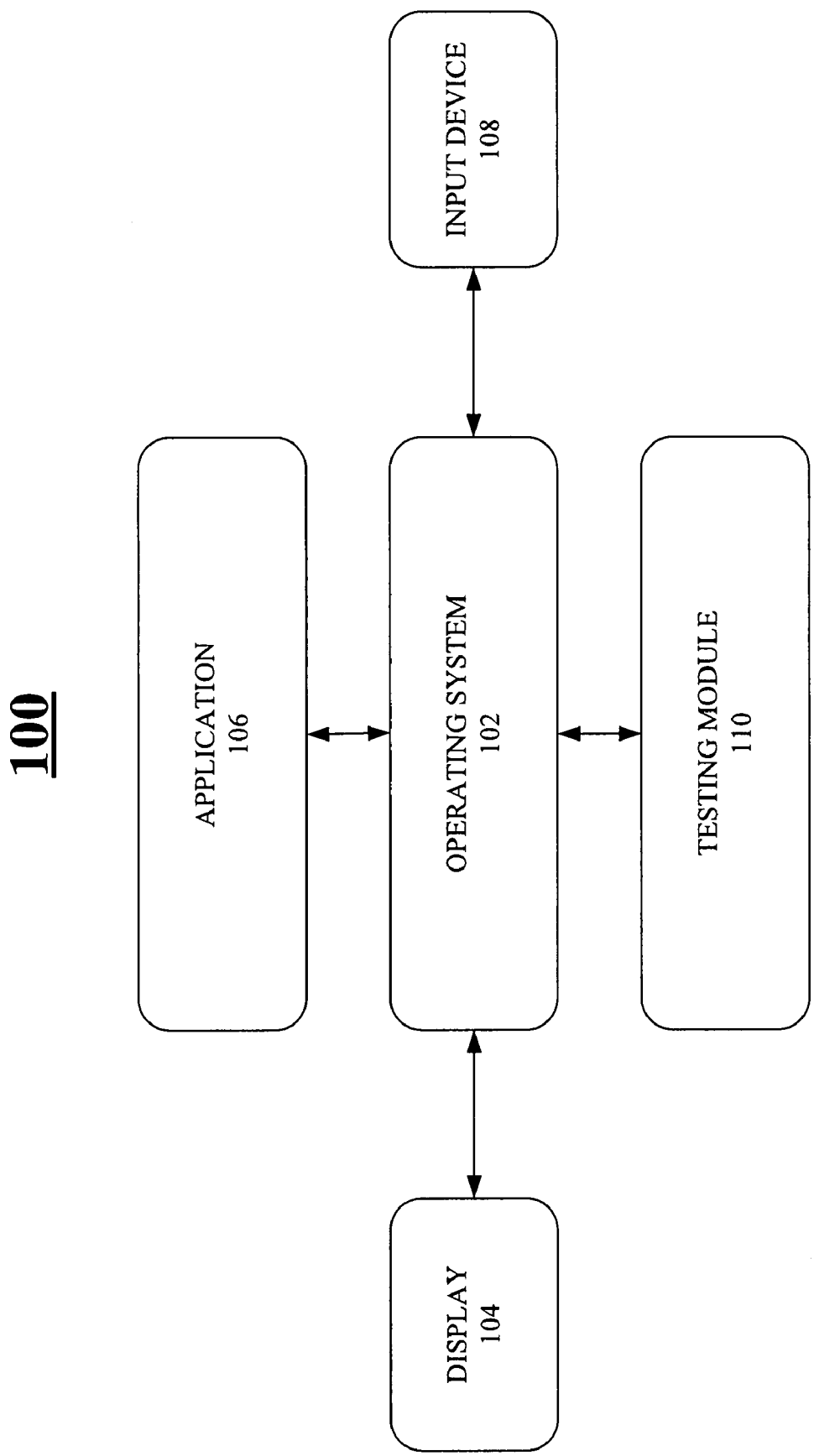
FIG. 1 illustrates an exemplary embodiment of a computer system.

FIG. 1 illustrates an exemplary computer system 100 suitable for implementing techniques for aligning and positioning objects according to one or more embodiments. The computer system 100 may be implemented, for example, as various devices including, but not limited to, a personal computer (PC), server-based computer, laptop computer, notebook computer, tablet PC, handheld computer, personal digital assistant (PDA), mobile telephone, combination mobile telephone/PDA, television device, set top box (STB), consumer electronics (CE) device, any other suitable computing or processing system which is consistent with the described embodiments.

As illustrated, the computer system 100 is depicted as a block diagram comprising several functional components or modules which may be implemented as hardware, software, or any combination thereof, as desired for a given set of design parameters or performance constraints. Although FIG. 1 may show a limited number of functional components or modules for ease of illustration, it can be appreciated that additional functional components and modules may be employed for a given implementation.

As used herein, the terms "component" and "system" are intended to refer to a computer-related entity, either hardware, a combination of hardware and software, software, or software in execution. For example, a component can be implemented as a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers as desired for a given implementation.

Various embodiments may be described in the general context of computer-executable instructions, such as program modules, being executed by a computer. Generally, program modules include any software element arranged to perform particular operations or implement particular abstract data types. Some embodiments also may be practiced in distributed computing environments where operations are performed by one or more remote processing devices that are linked through a communications network. In a distributed computing environment, program modules may be located in both local and remote computer storage media including memory storage devices.

As shown in FIG. 1, the computer system 100 may comprise an operating system 102 coupled to a display 104, an input device 106, an application 108, and a testing module 110. The operating system 102 may be arranged to control the general operation of the computer system 100 and may be implemented, for example, by a general-purpose operating system such as a MICROSOFT® operating system, UNIX® operating system, LINUX® operating system, or any other suitable operating system which is consistent with the described embodiments.

The display 104 may be arranged to present content to a user and may be implemented by any type of suitable visual interface or display device. Examples of the computer display 104 may include a computer screen, computer monitor, liquid crystal display (LCD), flat panel display (FPD), cathode ray tube (CRT), and so forth.

The input device 106 may be arranged to receive input from a user of a computer system 100. The input device 106 may comprise or be implemented as a keyboard and/or a pointing device such as a mouse, trackball, touch pad, stylus, tablet PC pen, touch screen, and so forth.

The computer system 100 may be configured to execute various computer programs such as application 108. Examples of application 108 may include, without limitation, business or office suite applications such as one or more MICROSOFT® OFFICE applications, database applications, communications applications (e.g., e-mail, instant messaging), web browsing applications, game applications, personal and contact information management applications, note taking applications, calendar applications, desktop publishing applications, graphical design applications, presentation applications, chart applications, spreadsheet applications, word processing applications, media applications, groupware applications, and so forth. Most applications provide a graphical user interface (GUI) to communicate information to a user.

In some cases, the application 108 can be used as stand-alone application, but also can operate in conjunction with server-side applications, such as a MICORSOFT EXCHANGE server, to provide enhanced functions for multiple users in an organization. Although particular examples of the application 108 have been provided, it can be appreciated that the application 108 may be implemented by any other suitable application which is consistent with the described embodiments.

The testing module 110 may be arranged to perform automated testing operations for a test object such as the operating system 102 and/or the application 108. In some embodiments, the testing module 110 may comprise or be implemented by one or more types of software testing products such as AUTOTESTER® from AUTOTESTER®, HOURGLASS 2000® from MAINWARE®, OPTA2000® from TANDSOFT®, PANORAMA-2® from INTERNATIONAL SOFTWARE AUTOMATION®, SIM2000® from DPE & ASSOCIATES®, SIMULATE 2000® from PRINCE SOFTWARE®, TARGET2000® from TARGETFOUR®, TRANSCENTURY DATE SIMULATOR® and ENTERPRIZE TESTER® from PLATINUM®, TALC 2000® from EXECOM®, TICTOC® from CICS®, TEST 2000® and AGER 2000® from MVS®, VECTORCAST® from VECTOR SOFTWARE®, VIA/AUTOTEST® from VIASOFT®, TEST SUITE 2000® from MERCURY INTERACTIVE®, WORKBENCH/2000® from MICROFOCUS®, and so forth. In other embodiments, the testing module 110 may be built into the operating system 102 and/or the application 108.

Although some embodiments may be described for testing a test object such as operating system 102 and/or application 108, it can be appreciated that the testing module 110 may potentially be used for testing other test objects as well. For example, testing module 110 may be used to test such target objects as consumer products, automotive products, electronic and electrical products, communications products, pharmaceutical products, biotech products, chemical products, mechanical products, financial products, and so forth. In some cases, the testing module 110 may be implemented using additional elements suitable for measuring certain logical or physical characteristics for a given target object to gather the relevant data needed for a given set of automated test operations. Examples of such additional elements may include various probes, electrical sensors, chemical sensors, temperature sensors, speed sensors, movement sensors, articulated robotic arms, radio-frequency signals, magnetic waves, electromagnetic waves, varying frequencies of light, sound waves, and so forth. The embodiments are not limited in this context.

The testing module 110 may be arranged to provide and run an organized set of test cases. In some embodiments, the set of test cases may comprise a suite of tests for accepting, certifying, assuring logo compliance of a software product such as operating system 102, application 108, and/or any customized version, aggregate build, and/or extension to operating system 102 and/or application 108. The embodiments are not limited in this context.

The testing module 110 may implement a test structure which correlates the tests cases. In one or more embodiments, the test structure may comprise prioritized test cases and dependencies between test cases based on predicted test case failure given failure of another test case. In various implementations, the test structure may comprise test cases organized into different layers and/or classified as parent test cases and child test cases. The testing module 110 may be arranged to run the set of test cases based on the dependencies among test cases, and test case failures may be investigated according to the dependencies. The testing module 110 may be arranged to run parent test cases before child test cases, and the failures of parent test cases may be investigated before failures of child test cases. In some cases, the testing module 110 may be arranged to skip one or more test cases that depend from a failed test case. The testing module 110 may perform previously skipped test cases to verify the test structure.

Operations for various embodiments may be further described with reference to one or more logic flows. It may be appreciated that the representative logic flows do not necessarily have to be executed in the order presented, or in any particular order, unless otherwise indicated. Moreover, various activities described with respect to the logic flows can be executed in serial or parallel fashion.

FIG. 2 illustrates a logic flow 200 representative of the operations executed by one or more embodiments described herein. The logic flow 200 may be performed, for example, to create a test structure implemented by elements of the computing system 100 or alternative elements as desired for a given set of design and performance constraints.

As shown, the logic flow 200 may comprise predicting test case failure given the failure of another test case (block 202). In various implementations, the nature of the failure predictions for the test cases may be manual or automatic. In some embodiments, for example, a manual prediction of test case failures may be introduced by the test case creator. In other embodiments, the prediction of test case failures may be automatic or probabilistic and calculated for the set of test cases from historical failure information.

When predicting test case failure from historical information, the confidence measure for the prediction of a failure may be based on conditioned probabilities. It can be verified that test cases are related when $P(A_{FAIL}/B_{FAIL}) != P(A_{FAIL})P(B_{FAIL})$.

For two non-independent tests A and B, the following comparisons are made:

$$P(A_{FAIL}/B_{FAIL}) = P(A_{FAIL}, B_{FAIL})/P(B_{FAIL})$$

$$P(B_{FAIL}/A_{FAIL}) = P(A_{FAIL}, B_{FAIL})/P(A_{FAIL})$$

In general, among test cases of the same relevance, the test cases having higher conditioned probabilities produce more information and are executed first. For example, if $P(A_{FAIL}/B_{FAIL}) > P(B_{FAIL}/A_{FAIL})$, test B will be run first, and test A can be considered to depend from test A.

For purposes of illustration, and not limitation, historical failure information for an exemplary set of test cases comprising Test1, Test2 and Test3 may be used to calculate predicted test case failure as follows. In this example, the test cases are arranged into a triangular matrix as shown in Table 1.

TABLE 1

|   | Test$_1$ | Test$_2$ | Test$_3$ |
|---|---|---|---|
| Test$_1$ |   |   |   |
| Test$_2$ |   | — |   |
| Test$_3$ |   | — | — |

After each run of the set of test cases, the failures for the test cases are counted, and the matrix is populated with the failure information. In this example, for the first run, Test$_1$ fails, and Test$_2$ and Test$_3$ pass. After the first run, the matrix of test cases may be populated with the failure information as shown in Table 2.

TABLE 2

| 1 | Test$_1$ | Test$_2$ | Test$_3$ |
|---|---|---|---|
| Test$_1$ | 1 | 0 | 0 |
| Test$_2$ | — | 0 | 0 |
| Test$_3$ | — | — | 0 |

In this example, for the second run, Test$_1$ and Test$_3$ fail, and Test$_2$ passes. After the second run, the matrix of test cases may be populated with the failure information as shown in Table 3.

TABLE 3

| 2 | Test$_1$ | Test$_2$ | Test$_3$ |
|---|---|---|---|
| Test$_1$ | 2 | 0 | 1 |
| Test$_2$ | — | 0 | 0 |
| Test$_3$ | — | — | 1 |

In this example, for the third run, Test$_1$ and Test$_2$ pass, and Test$_3$ fails. After the third run, the matrix of test cases may be populated with the failure information as shown in Table 4.

TABLE 4

| 3 | Test$_1$ | Test$_2$ | Test$_3$ |
|---|---|---|---|
| Test$_1$ | 2 | 0 | 1 |
| Test$_2$ | — | 0 | 0 |
| Test$_3$ | — | — | 2 |

In this example, after two hundred runs, the matrix of test cases may be populated with the failure information as shown in Table 5.

TABLE 5

| 200 | Test$_1$ | Test$_2$ | Test$_3$ |
|---|---|---|---|
| Test$_1$ | 60 | 10 | 38 |
| Test$_2$ | — | 30 | 15 |
| Test$_3$ | — | — | 52 |

In this example, probabilities of test case failure (number of failures/number of test executions) for each of the test cases may be extrapolated from Table 5 as follows:

$P(\text{FAIL}_{TEST1}) = 0.30$ $P(\text{FAIL}_{TEST2}) = 0.15$ $P(\text{FAIL}_{TEST3}) = 0.26$ In this example, $P(\text{FAIL}_{TEST1}/\text{FAIL}_{TEST2}) = 0.33$ which is similar to $P(\text{FAIL}_{TEST1})$. As such, TEST$_2$ does not provide much information about TEST$_1$. However, $P(\text{FAIL}_{TEST1}/\text{FAIL}_{TEST3}) = 0.73$ which is very different from $P(\text{FAIL}_{TEST1})$. Therefore, TEST$_3$ provides information about TEST$_1$. $P(\text{FAIL}_{TEST3}/\text{FAIL}_{TEST1}) = 0.63$ which is different from $P(\text{FAIL}_{TEST3})$ but smaller than $P(\text{FAIL}_{TEST1}/\text{FAIL}_{TEST3})$.

It can be appreciated that for a set of test cases, not all test cases are run together all the time. Accordingly, the probability of a test case failure given the failure of another test case may be based on the number of times test cases are executed together in a run, the number of failures for a test case when run with other test cases, and the number of times test cases fail together.

For purposes of illustration, and not limitation, historical failure information for an exemplary set of test cases comprising Test 137872 (BVT Outline), Tests 138767 (BVT Keyboard navigation), Test 141333 (Insert Document), Test 141917 (Find with AND), Test 150332 (Move Outline Down), Test 150335 (Move Outline Up), and Test 153702 (Promote and demote Outline) may be used to calculate predicted test case failure as follows.

In this example, the test cases may be arranged into a matrix comprising the number of times test cases are executed together in a run as shown in Table 6.

TABLE 6

|   |   | Number of executions of both scenarios in the same run | | | | | | |
|---|---|---|---|---|---|---|---|---|
|   |   | 137872 | 138767 | 141333 | 141917 | 150332 | 150335 | 153702 |
| Run | 137872 | 61 | 61 | 33 | 58 | 51 | 51 | 48 |
|   | 138767 | 61 | 61 | 33 | 58 | 51 | 51 | 48 |
|   | 141333 | 33 | 33 | 33 | 33 | 33 | 33 | 33 |
|   | 141917 | 58 | 58 | 33 | 58 | 48 | 48 | 46 |
|   | 150332 | 51 | 51 | 33 | 48 | 51 | 51 | 48 |
|   | 150335 | 51 | 51 | 33 | 48 | 51 | 51 | 48 |
|   | 153702 | 48 | 48 | 33 | 46 | 48 | 48 | 48 |

In this example, the test cases may be arranged into a matrix comprising the of failures for a test case when run with other test cases as shown in Table 7.

TABLE 7

Number of failures when run with the other scenarios

| | | 137872 | 138767 | 141333 | 141917 | 150332 | 150335 | 153702 |
|---|---|---|---|---|---|---|---|---|
| Failure | 137872 | 16 | 17 | 32 | 47 | 18 | 21 | 18 |
| | 138767 | 16 | 17 | 32 | 47 | 18 | 21 | 18 |
| | 141333 | 14 | 15 | 32 | 29 | 14 | 15 | 14 |
| | 141917 | 15 | 16 | 32 | 47 | 17 | 18 | 18 |
| | 150332 | 16 | 17 | 32 | 39 | 18 | 21 | 18 |
| | 150335 | 16 | 17 | 32 | 39 | 18 | 21 | 18 |
| | 153702 | 15 | 16 | 32 | 39 | 15 | 18 | 18 |

In this example, the test cases may be arranged into a matrix comprising the number of times test cases fail together as shown in Table 8.

TABLE 8

Number of times both scenarios fail together

| | | 137872 | 138767 | 141333 | 141917 | 150332 | 150335 | 153702 |
|---|---|---|---|---|---|---|---|---|
| Failure | 137872 | 16 | 16 | 14 | 15 | 16 | 16 | 15 |
| | 138767 | 16 | 17 | 15 | 16 | 16 | 16 | 15 |
| | 141333 | 14 | 15 | 32 | 29 | 14 | 14 | 14 |
| | 141917 | 15 | 16 | 29 | 47 | 15 | 15 | 17 |
| | 150332 | 16 | 16 | 14 | 15 | 18 | 18 | 15 |
| | 150335 | 16 | 16 | 14 | 15 | 18 | 21 | 15 |
| | 153702 | 15 | 15 | 14 | 17 | 15 | 15 | 18 |

In this example, the number of times test cases are executed together in a run (Table 6), the number of failures for a test case when run with other test cases (Table 7), and the number of times test cases fail together (Table 8) may be used to create a matrix of the test cases comprising the probability of a test case failing given another failure as shown in Table 9.

TABLE 9

The probability of a scenario failing given another failure Given

| | | 137872 | 138767 | 141333 | 141917 | 150332 | 150335 | 153702 |
|---|---|---|---|---|---|---|---|---|
| Prob of Failure | 137872 | 1 | 0.94 | 0.44 | 0.32 | 0.89 | 0.76 | 0.83 |
| | 138767 | 1 | 1 | 0.47 | 0.34 | 0.89 | 0.76 | 0.83 |
| | 141333 | 1 | 1 | 1 | 1 | 1 | 0.93 | 1 |
| | 141917 | 1 | 1 | 0.91 | 1 | 0.88 | 0.83 | 0.94 |
| | 150332 | 1 | 0.94 | 0.44 | 0.38 | 1 | 0.86 | 0.83 |
| | 150335 | 1 | 0.94 | 0.44 | 0.38 | 1 | 1 | 0.83 |
| | 153702 | 1 | 0.94 | 0.44 | 0.44 | 1 | 0.83 | 1 |

Referring again to FIG. 2, the logic flow 200 may comprise determining dependencies between tests cases based on predicted test case failure (block 204), prioritizing test cases and dependencies (block 206), and creating a test structure according to the prioritized test cases and dependencies (block 208).

In one or more embodiments, dependencies between tests cases may be determined based on conditioned probabilities for test cases failure among the test cases and various algorithms may be applied to the conditioned probabilities to prioritize the test case and dependencies. In general, the algorithms may be arranged to maximize the confidence on the predictions within the test structure and/or to maximize the number of decisions within the test structure. It can be appreciated that more time can be saved when more decisions are made.

In some embodiments, the test structure may be created based on a "layering" algorithm. In general, the layering case may be arranged to maximize the confidence of predicted failures. In such embodiments, each test case may be assigned to a layer according to the number of dependent test cases that have a high confidence of failure in the event that that a particular test case fails. Test cases that have more dependent test cases are provided in upper layers. Test cases that have fewer dependent test cases are provided in lower layers. In some cases, a particular test may be place into a certain layer if it has more than a certain threshold number of dependencies. For example, a test case having five dependencies may be placed in a lower layer, while a test case having twenty dependencies may be placed in upper layer.

Test cases may be layered based on conditioned probabilities. For example, test cases having high conditioned probabilities may be considered to have more influence on other test cases and placed in upper layers. Test cases having lower conditioned probabilities may be considered to have less influence on other test cases and placed in lower layers.

After test cases are assigned to layers, it may be determined whether failure of particular test cases in higher layer accurately predicts failure of particular test cases in lower layers. If the probability of failure for a test case in a lower layer can be determined from the failure of a test case in an upper layer, the test cases may be classified to reflect such relationship. In one or more embodiments, for example, test cases may be classified as parent test cases and child test cases. A test case in a higher layer which, in the event of failure, is found to provide information about a test case in a lower layer may be classified as a parent test case. A test case in a lower layer can be considered a child test case, and then test cases in higher layers can be analyzed to see whether they can be classified as a parent test case for the particular child test case. In general, an attempt may be made to classify parent test cases in the closest possible layer to a child test case under consideration.

In some embodiments, a test case in the lower layer may be connected to a particular parent test case in an upper layer based on conditioned probabilities. As shown in Table 9, for example, the probability of Test 141917 failing given the failure of Test 138767 is higher than the probability of Test 141917 failing given the failure of Test 150332. As such, Test 141917 can be classified as a child test case related to Test 138767.

In some embodiments, the test structure may be created based on a "waterfall" algorithm. In general, the waterfall case may be arranged to maximize the number of predictions or dependencies among the test cases within the test structure. In such embodiments, all possible parent-child relationships above a threshold are ordered and the relationship of each possible parent-child relationship is evaluated to determine the appropriate parent-child relationships. For each test case, if may determined whether the particular test cases can qualify as a dependent (e.g., child or leaf) of another test case. In some cases, a test case can depend from one or more parents or roots. The waterfall algorithm also may be arranged determine actual or best dependencies (e.g., parent-child or root-leaf) among the test cases. For example, the actual parent for a child test case may be the parent of a possible parent.

For purposes of illustration, and not limitation, consider the conditioned probabilities among Test 138767, Test 141333, and Test 141917 of Table 9. All the conditioned probabilities are relatively high indicating possible parent-child relationships. Since Test 141333 fails whenever Test 138767 fails, Test 141333 clearly can be classified as a child test case of Test 138767. Because the probability of Test 141917 failing given the failure of Test 138767 is higher than the probability of Test 141917 failing given the failure of Test 141333, Test 141917 also can be classified as a child test case of Test 138767.

In various embodiments, the test structure may be used to reduce the time to run the set of test case and/or to investigate failures. Historical failure information for the test cases may be used to build a test structure indicating dependencies among the test cases. In various implementations, the test structure may be represented as graph comprising multiple layers and/or dependent relationships (e.g., parent-child or root-leaf) among test cases. For each parent test cases, a number of dependent test cases and the confidence in the prediction of a failure for each dependent test case may be determined based on conditioned probabilities. Test cases having the highest number of dependencies can be identified, and the identification of dependent test cases may allow a reduction in run time and the number of failures to investigate.

In some cases, the order of the execution of the test cases and perhaps even the need to execute a test case may be determined by such layers and/or dependent relationships.

For example, testing may begin at higher layers and/or roots to enable faster evaluation of a build. The testing of a parent test case may take priority over the testing of a child test case both in terms of execution and failure investigation. When multiple tests are failing, investigation should be focused on higher layer and/or parent cases. Accordingly, the most important test cases may be run first, and the causes for failure of the most important test cases may be investigated and corrected. Then, the effect of the correction on dependent test cases may be analyzed. It can be appreciated that the best time to investigate the failure of a child test case may be the first time its parent passes.

In various embodiments, the test structure may be used to compare actual and simulated testing results to prioritize what test failures should be investigated first and which ones are expected due to failures in previous tests in order to save time in failure investigation. The test structure also may be used to assess the risk of a change by locating the highest test case that the change may cause to fail and predict the final number of failed test cases early in the test run.

The test structure may allow the analysis of a group of test cases to properly classify test cases, find abnormalities in trends, and to identify previously undetermined test case dependencies. The causes of aberrations may be investigated in terms of the test code and the product under test. If necessary, the test structure can be reorganized to properly reflect dependencies among test cases.

Figure 3:
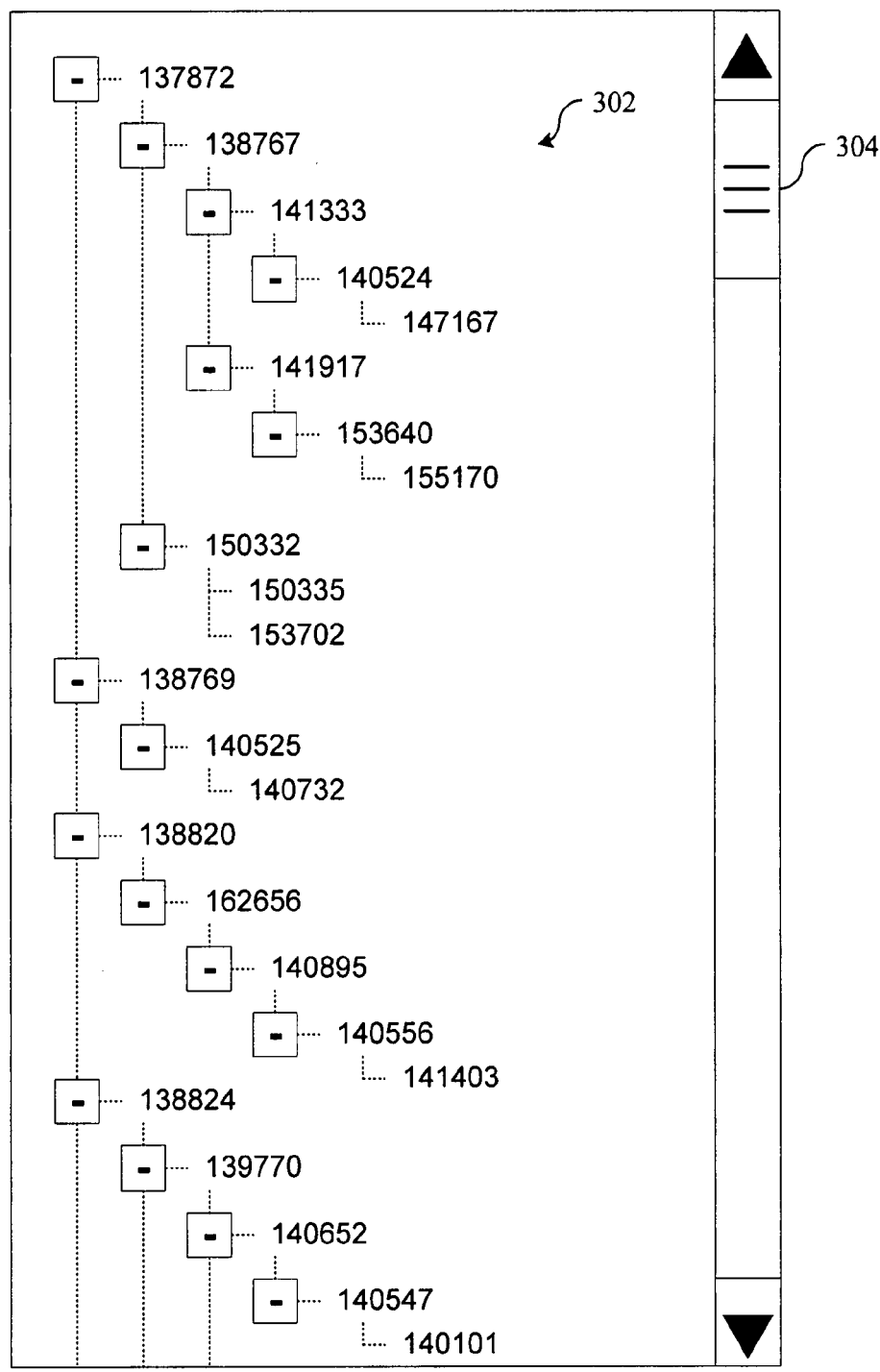
FIG. 3 illustrates an exemplary embodiment of a graphical user interface.

FIG. 3 illustrates an exemplary GUI 300. In various implementations, the GUI 300 may be presented on the display 104 of the computer system 100. As shown, the GUI 300 may comprise a test structure 302, a scroll bar 304 to view different portions of the test structure 302, and a text box 306 to display the path for the test structure 302.

In this embodiment, the test structure 302 may be constructed according to the waterfall algorithm to maximize the number of decisions and/or dependencies. As shown, the test structure 302 represents several parent or root test cases such as Test 137872, Test 138769, Test 138820, and Test 138824. In various implementations, these test cases may be run first and/or failures for such test case cases may be investigated before failures of child or leaf test cases. For example, if Test 137872 fails, Test 138767 and Test 150332 are expected to fail. The embodiments are not limited in this context.

Figure 4:
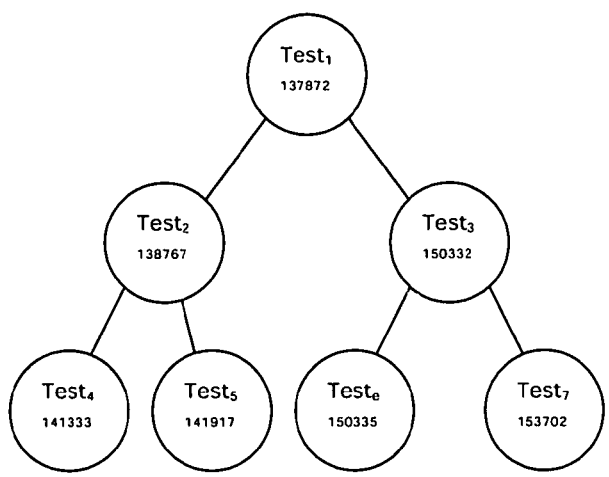
FIG. 4 illustrates an exemplary embodiment of a test structure.

FIG. 4 illustrates running an exemplary test structure 400. As shown, the test structure 400 may represent the following structured set of test cases:

---

137872 BVT Outline (Test$_1$)
    138767 BVT Keyboard navigation (Test$_1$)
        141333 Insert Document (Test$_4$)
        141917 Find with AND (Test$_5$)
    150332 Move Outline Down (Test$_2$)
    150335 Move Outline Up (Test$_6$)
    153702 Promote and demote Outline (Test$_7$)

---

In various implementations, the execution order of the test cases and the need to execute a test case may be determined by the result of its parent. For example, test cases predicted to fail can be skipped to speed up testing. Subsequently, the test cases may be run to verify accuracy of the test structure 400. Confirmation that test cases fail when expected can be made to verify the accuracy of the test cases and/or the underlying assumptions. If a test case unexpected passes, however, the test structure 400 may require modification.

In this embodiment, Test$_1$ (BVT Outline) may be run first. If Test$_1$ fails, it can be appreciated that Test$_2$ and Test$_3$ are more likely to fail. If the dependent probability is very high or if the dependency has been fixed by the test case creator, the test case "soft-fails" and can be consider a failure. Subsequent verification of the failure may be made. The same applies to $Test_{4-7}$.

In this embodiment, before running a test, a check may be made that all test cases from which it depends have succeeded. If $Test_1$ passes, $Test_2$ and $Test_3$ will start running. If $Test_2$ fails, $Test_4$ and $Test_5$ can be considered very likely to fail or a "soft-failures." The determination of a soft-failure can be associated to a certain degree of dependency among tests.

The run of the test structure 400 will continue with $Test_3$. If $Test_3$ passes, $Test_4$ and $Test_5$ may be skipped and $Test_6$ and $Test_7$ may be run. Later, $Test_3$ and $Test_4$ can be run to confirm that they fail as expected given the $Test_2$ failure.

It can be appreciated that the test structure 400 may be used to assess the quality of a build and/or the risk of a change. For example, a change that affects $Test_5$ is less disruptive or dangerous that a change that affects $Test_2$. Such decisions may be done automatically based on past results. The embodiments are not limited in this context.

Figure 5:
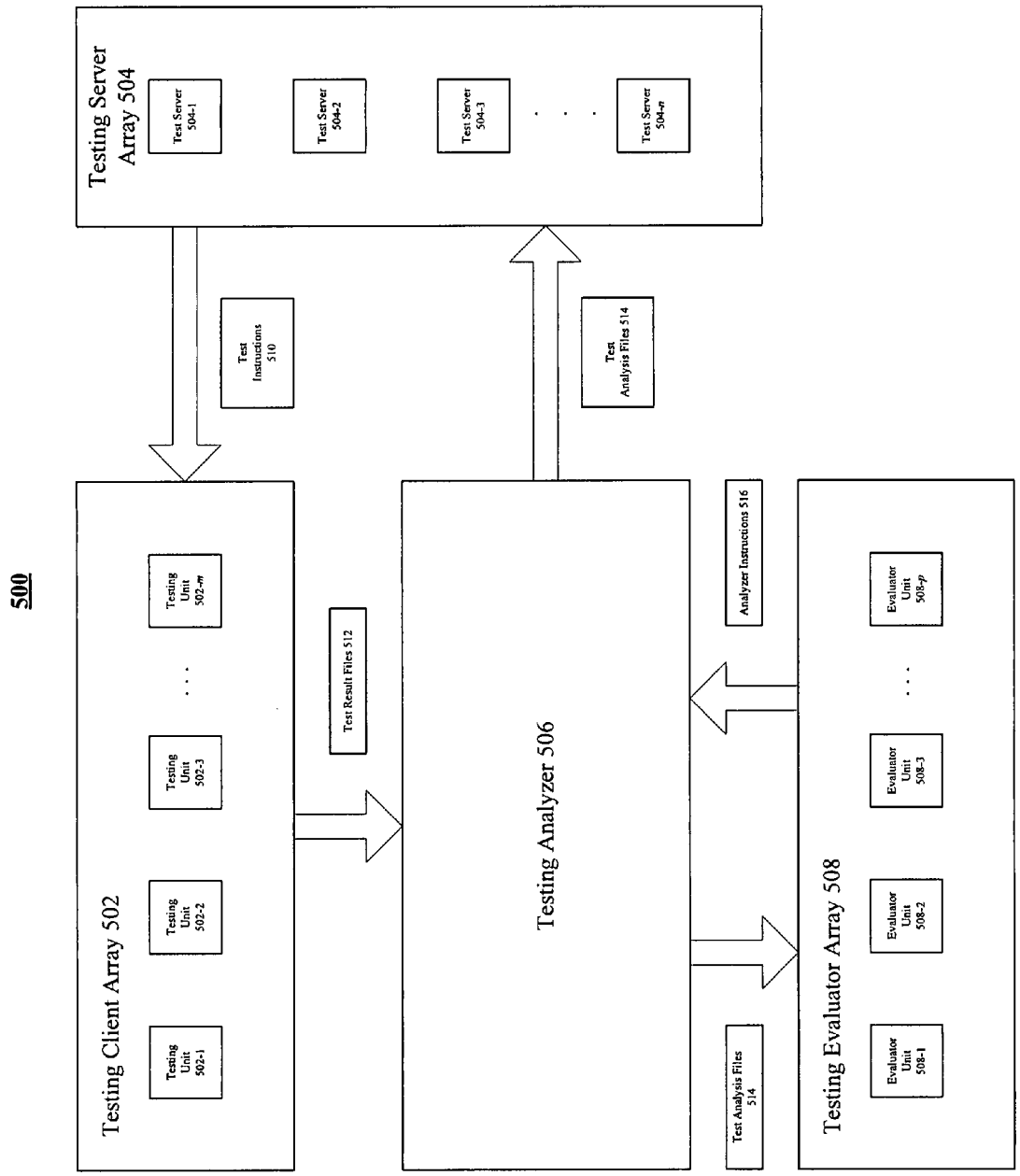
FIG. 5 illustrates an exemplary embodiment of a testing system.

FIG. 5 illustrates a block diagram of a testing system 500 suitable for perform automated testing operations for a target object. The target object may include any type of product capable of being measured using automated test operations to produce multiple test results. For clarity and by way of representative example only, testing system 500 may be further described below with elements suitable to perform automated testing operations for a software product as the test object.

As shown, testing system 500 may comprise elements such as a testing client array 502, a testing server array 504, a testing analyzer 506, and a testing evaluator array 508. Each element may be implemented as hardware, software, or any combination thereof, as desired for a given set of design parameters or performance constraints.

In various embodiments, testing client array 502 may comprise multiple testing units 502-1-m, and testing server array 504 may comprise multiple test servers 504-1-n. Testing units 502-1-m may be used individually or collectively to perform testing operations for a test object, such as a software application. For example, testing units 502-1-m may be used independently to test different software applications or the same software application. Testing units 502-1-m may also be used collectively to test a single software application or multiple software applications in a distributed manner.

Each test server 504-1-n may operate as an automation controller to manage testing operations for testing client array 502. Test servers 504-1-n may provide test instructions 510 to one or more testing units 502-1-m of testing client array 502. Test instructions 510 may include any appropriate commands or data used to control testing operations for testing client array 502 in accordance with a particular testing product used to perform the testing operations.

In general operation, testing client array 502 may operate with testing server array 504 to perform automated testing operations for a test object such as a software application. Testing client array 502 and testing server array 504 may operate in a peer-to-peer, client-server, or distributed architecture, as desired for a given implementation.

Testing client array 502 and testing server array 504 may use automated testing techniques to perform a large volume of predetermined tests, and return test result files 512 that may aid in the investigation of failures. It may be appreciated that test result files 512 may represent results from a single test or multiple tests, as desired for a given implementation. When representing multiple tests, a single test result file 512 may have a data structure that allows other elements of testing system 500 (e.g., testing analyzer 506) to extract and parse information representing individual tests. The embodiments are not limited in this context.

Testing operations typically involve performing an operation to determine if the actual result matches an expected result. If the actual and expected results do not match, the test typically results in a failure. In various embodiments, test result files 512 may include failure information. Failure information may refer to any information or data that indicates a software product has failed a given set of test conditions. The failure information typically includes relevant test result information that is likely to be useful for analysis.

Test result files 512 may comprise computer readable files containing information about a test and the result of the test. Test result files 512 can be automatically generated, as in the case of automated software testing, or can be manually generated by a human entering information about test results into a computer. In various embodiments, test result files 512 can be stored in any computer readable format as desired for a given implementation. One example of a file format may include the Extensible Markup Language (XML) format, which utilizes tags to identify data in a file. Other examples of file formats may include the Hyper-Text Markup Language (HTML), the MICROSOFT WORDS® Markup Language (WordML), and so forth. Numerous other file formats (e.g., .doc, .txt, .rtf, .pdf, .vsd, etc.) are available based on an application designed to use the format.

In various embodiments, testing system 500 may include testing analyzer 506. Testing analyzer 506 may be arranged to assist in analyzing and organizing the large volumes of test result files 512 received from testing client array 502. Testing analyzer 506 may receive and analyze failure information from one or more test result files 512. The testing analyzer 106 may generate test analysis files 114 comprising information that may be used to predict. Testing analyzer 106 also may output test analysis files 514 to testing server array 504 to influence automated test runs for testing client array 502.

In various embodiments, testing system 500 may include testing evaluator array 508 to receive test analysis files 514. Testing evaluator array 508 may comprise multiple evaluator units 508-1-p. Evaluator units 508-1-p may be used by human test result analyzers and may each include a GUI to assist in conveying information about test analysis files 514 to the user. Testing evaluator array 508 also may be used to convey analyzer instructions 516 to influence or control various analysis parameters used by testing analyzer 506. For example, analyzer instructions 516 may include various values, parameters or weights to modify the operations of testing analyzer 506.

It is worthy to note that although testing analyzer 506 is described as part of testing system 500, it may be appreciated that testing analyzer 506 may be implemented independent from testing system 500 as well. For example, a single device (e.g., a testing unit 502-1-m) implemented with testing analyzer 506 may be arranged with one or more elements of testing client array 502, testing server array 504, and/or testing evaluator array 508, to perform the various testing operations as described herein, as well as other testing operations.

It can be appreciated that various embodiments may be implemented using hardware elements, software elements, or a combination of both. Examples of hardware elements may include logic devices, microprocessors, circuits, circuit elements (e.g., transistors, resistors, capacitors, inductors, and so forth), integrated circuits, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

In some cases, various embodiments may be implemented as an article of manufacture. The article of manufacture may be implemented, for example, as a computer-readable storage medium storing logic and/or data for performing various operations of one or more embodiments. The computer-readable storage medium may include one or more types of storage media capable of storing data, including volatile memory or, non-volatile memory, removable or non-removable memory, erasable or non-erasable memory, writeable or re-writeable memory, and so forth. The computer-readable medium may store logic comprising instructions, data, and/or code that, if executed by a computer system, may cause the computer system to perform a method and/or operations in accordance with the described embodiments. Such a computer system may include, for example, any suitable computing platform, computing device, computer, processing platform, processing system, processor, or the like implemented using any suitable combination of hardware and/or software.

Various embodiments may comprise one or more elements. An element may comprise any structure arranged to perform certain operations. Each element may be implemented as hardware, software, or any combination thereof, as desired for a given set of design and/or performance constraints. Although an embodiment may be described with a limited number of elements in a certain topology by way of example, the embodiment may include more or less elements in alternate topologies as desired for a given implementation.

Although some embodiments may be illustrated and described as comprising exemplary functional components or modules performing various operations, it can be appreciated that such components or modules may be implemented by one or more hardware components, software components, and/or combination thereof. The functional components and/or modules may be implemented, for example, by logic (e.g., instructions, data, and/or code) to be executed by a logic device (e.g., processor). Such logic may be stored internally or externally to a logic device on one or more types of computer-readable storage media.

It also is to be appreciated that the described embodiments illustrate exemplary implementations, and that the functional components and/or modules may be implemented in various other ways which are consistent with the described embodiments. Furthermore, the operations performed by such components or modules may be combined and/or separated for a given implementation and may be performed by a greater number or fewer number of components or modules.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. It is worthy to note that although some embodiments may describe structures, events, logic or operations using the terms "first," "second," "third," and so forth, such terms are used merely as labels, and are not intended to impose numerical requirements on their objects. Further, such terms are used to differentiate elements and not necessarily limit the structure, events, logic or operations for the elements.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer system comprising:
a testing module to run an organized set of test cases; and
a display to present a test structure for the set of test cases, the test structure comprising prioritized test cases and dependencies between test cases based on predicted test case failure given failure of another test case, wherein the test cases are organized into different layers based on number of dependencies.

2. The computer system of claim 1, wherein failures are investigated according to the dependencies between test cases.

3. The computer system of claim 1, the testing module to run the set of test cases based on the dependencies.

4. The computer system of claim 1, the test structure organized into parent test cases and child test cases.

5. The computer system of claim 4, wherein failures of parent test cases are investigated before failures of child test cases.

6. The computer system of claim 4, the testing module to run parent test cases before child test cases.

7. The computer system of claim 1, the testing module to skip one or more test cases that depend from a failed test case.

8. The computer system of claim 7, the testing module to perform previously skipped test cases to verify the test structure.

9. A method, comprising:
predicting test case failure given failure of another test case;
determining dependencies between test cases based on the predicted test case failure;

prioritizing test cases and dependencies;

creating a test structure according to the prioritized test cases and dependencies; and classifying test cases into different layers based on number of dependencies.

10. The method of claim 9, comprising calculating conditioned probabilities for a set of test cases from historical failure information.

11. The method of claim 10, wherein the historical failure information comprises number of times test cases are executed together in a run, number of failures for a test case when run with other test cases, and number of times test cases fail together.

12. The method of claim 9, comprising classifying tests cases as parent test cases and child test cases.

13. An article comprising a computer-readable storage medium storing instructions that if executed enable a computer system to:

run an organized set of test cases;

display a test structure for the set of test cases, the test structure comprising prioritized test cases and dependencies between test cases based on predicted test case failure given failure of another test case and organized into different layers based on number of dependencies; and run the set of test cases based on the dependencies between the test cases.

14. The article of claim 13, the test structure organized into different layers, the computer-readable storage medium storing instructions that if executed enable the computer system to investigate the set of test cases based on the dependencies between the test cases.

15. The article of claim 13, the test structure organized into parent test cases and child test cases, the computer-readable storage medium storing instructions that if executed enable the computer system to investigate failed parent test cases before failed child test cases.

16. The article of claim 13, the test structure organized into parent test cases and child test cases, the computer-readable storage medium storing instructions that if executed enable the computer system to run parent test cases before child test cases.

17. The article of claim 13, the computer-readable storage medium storing instructions that if executed enable the computer system to skip one or more test cases that depend from a failed test case.

* * * * *

UNITED STATES PATENT AND TRADEMARK OFFICE
CERTIFICATE OF CORRECTION

| | | |
|---|---|---|
| PATENT NO. | : 7,840,844 B2 | Page 1 of 1 |
| APPLICATION NO. | : 11/787319 | |
| DATED | : November 23, 2010 | |
| INVENTOR(S) | : Adam Garland et al. | |

It is certified that error appears in the above-identified patent and that said Letters Patent is hereby corrected as shown below:

In column 7, line 2, after "comprising the" insert -- number --.

Signed and Sealed this
First Day of February, 2011

David J. Kappos
*Director of the United States Patent and Trademark Office*